United States Patent Office 3,452,590
Patented July 1, 1969

3,452,590
CARBURETOR FLOW TESTING APPARATUS
Richard C. Wrausmann and William R. Arentsen, St. Louis, Mo.; said Wrausmann assignor to ACF Industries, Inc., New York, N.Y., a corporation of New Jersey
Filed June 24, 1966, Ser. No. 560,243
Int. Cl. G01n *19/00*
U.S. Cl. 73—118   6 Claims

ABSTRACT OF THE DISCLOSURE

A test stand for the adjustment of carburetors during production includes a stand for clamping a carburetor to an air conduit connected to a constant vacuum source and a fuel line connected to the carburetor. Flow rate sensing means in the air conduit are connected to a transducer for generating an electrical signal representative of the air flow rate. A flowmeter in the fuel line is connected to circuits which generate an electrical signal representative of the fuel flow rate. A divider circuit obtains the ratio of these two signals and supplies the ratio to a servo-voltmeter, which indicates whether the carburetor is adjusted so that the air-fuel ratio is within prescribed limits. Another servo-voltmeter indicates air flow rate.

---

The invention relates to a carburetor testing apparatus giving a direct reading of the air-fuel flow ratio, and particularly to such a test stand having analog computing devices for measuring the air-fuel flow ratios from curb idle to 30 m.p.h. speeds.

At present, carburetors are normally tested and adjusted by positioning the carburetor throttle valve while observing a mercury manometer which registers air flow. Thereafter, the carburetor mixture valves are adjusted while observing a float element movably carried in a tapered glass tube (variable area flowmeter) measuring fuel flow. Such measurements are made for a number of different "speed" positions of the carburetor. Stabilization of the several flow readings, to achieve desired accuracy, requires an appreciable amount of time. Further, meter resolution is poor at the low flow rates, and air flow measurements at idle and high speeds must be made on different manometers.

It is therefore one object of the invention to increase the speed and accuracy of carburetor testing. This is done by computing and presenting a reading of the air-fuel ratio, which is the quantity of interest, instead of measuring separately the fuel rate corresponding to each given air flow rate.

Another object of the invention is to accurately measure the performance of carburetors over a wide range.

Still another object of the invention is to provide substantially instantaneous computation and indication of the air-fuel flow ratio.

Another object of the invention is to average out or suppress minor short period fluctuations in the air and fuel measurements in order to obtain steady readings.

A still further object is to provide a carburetor test apparatus which provides for the operation, a high degree of resolution in reading air flow and air-fuel ratio.

Yet another object is to prevent the taking of erroneous readings during transient flow conditions.

Still other objects and advantages of the invention will become apparent from the following description thereof.

The invention is illustrated in the accompanying drawing in which.

Figure 1:
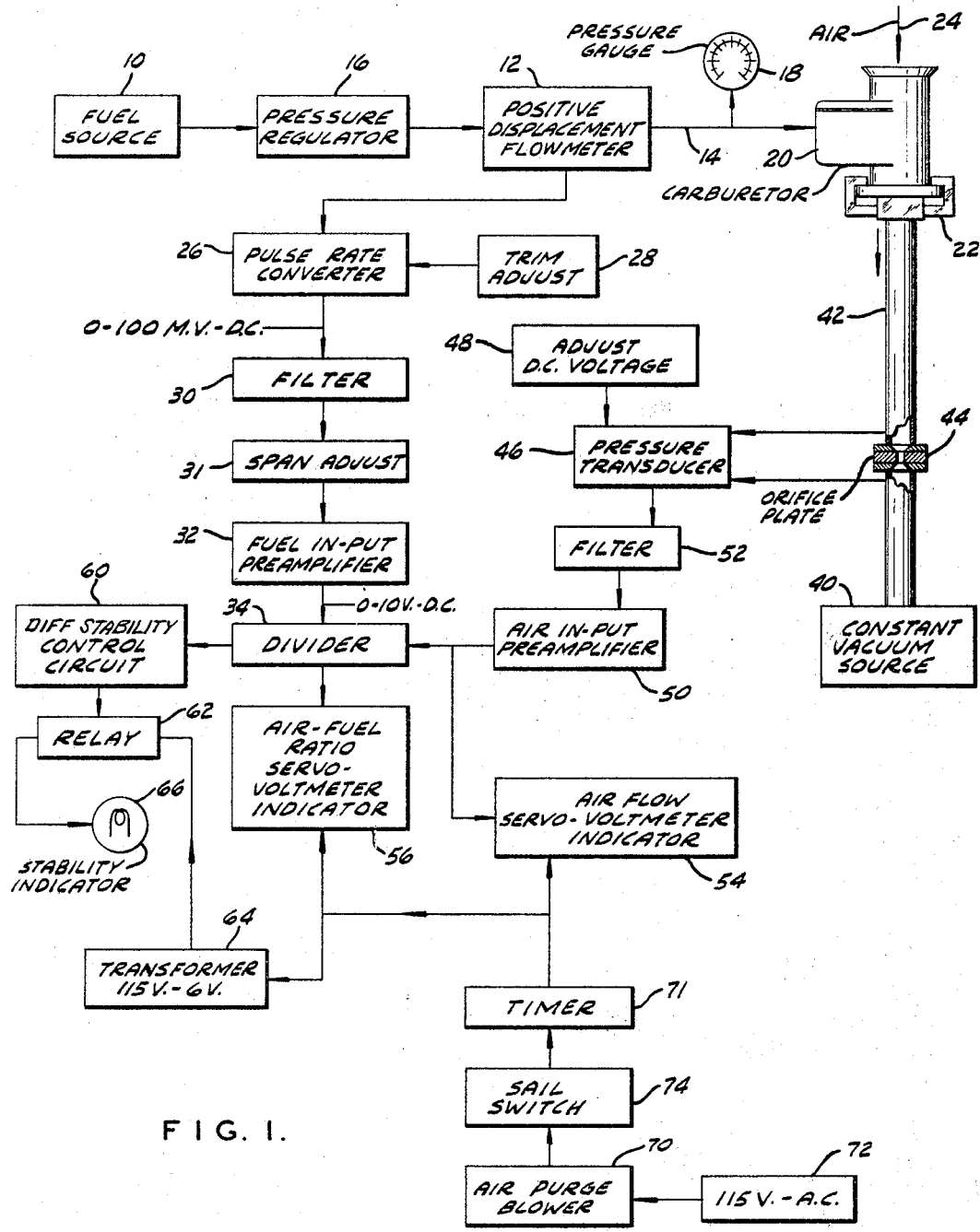
FIGURE 1 is a block diagram of one embodiment of the invention.

Referring to the drawing, liquid fuel (or a liquid having physical properties to simulate fuel), is supplied by a regulated pressure fuel source 10 to a pressure regulator 16 and thence through a positive displacement fuel flowmeter 12 to a fuel line 14, provided with pressure gauge 18. Fuel line 14 is connected to the fuel inlet of carburetor 20 to be calibrated and which is mounted on a suitable stand 22. The air inlet of the carburetor may be exposed to ambient air, as indicated at 24. A suitable fuel flowmeter 12 is the Brooks "VAF" type manufactured by the Brooks Instrument Company of Hatfield, Pa. Pulses from flowmeter 12 are fed to linear converter 26, which provides a D.C. output adapted to be adjusted to a desired range of approximately 0–100 millivolts by an adjusting device 28 forming part of the converter. The output of converter 26 is fed through filter 30 to a span adjust circuit 31 and thence to preamplifier 32 having adjustable bias and gain controls A suitable linear converter 26 is the "Hydropoise" Model 4100 made by the Brooks Manufacturing Company. The output of preamplifier 32, which may have a range of 0–10 volts D.C., is fed to divider circuit 34. Another input fed to divider circuit 34 is a D.C. voltage, preferably in the same 0–10 voltage range, representing the air flow rate.

Air flow through the carburetor is induced by apparatus 40 producing a constant vacuum in air flow line 42 connected to the outlet of the carburetor. Air line 42 has a restricted orifice plate 44 or the like which is calibrated, so that it is known what the rate of air flow is for every pressure drop across the orifice plate. The pressure drop across orifice plate 44 is impressed on pressure transducer 46. The latter is supplied with an adjustable D.C. voltage from source 48, which has a predetermined value to give predetermined voltage outputs at the pressure differences being measured thereby. A suitable pressure transducer 46 is the Baldwin-Lima-Hamilton Series 1100 strain gauge type. The output of pressure transducer 46 is fed to filter 52, through adjustable amplifier 50, and thence to divider 34. While various divider circuits may be used, a suitable one has been found to be the Type 19–302 made by the Devar-Kinetics Division of Consolidated Electrodynamics Company of Bridgeport, Conn. Divider 34 functions to obtain the quotient of the two input voltages representing the rtaes of fuel flow, and air flow respectively, to yield a D.C. voltage output representing the air-fuel flow rate ratio. This voltage is supplied to servo-voltmeter indicator 56. Filter 52, as well as filter 30 in the fuel measuring circuit, serve to filter or average out rapid fluctuations which tend to make measurements unsteady. Indicators 54 and 56 are identical and will be described further with reference to FIGURE 2.

One fault associated with prior carburetor test stands is that an operator, working under high speed production conditions, tends to anticipate readings instead of waiting for the readings to stabilize. To overcome this tendency, a stability indicating circuit is connected to indicate stabilization of the air flow and fuel flow. For this purpose, stability indicating circuit 60–62–66 is illustrated connected to the output of divider 34. Although not shown, circuit 60–62–66 may be connected to the output of amplifier 32 as well as filter 52, or to the error voltage outputs of servo-voltmeters 54 and 56. As shown in FIGURE 1, stability control circuit 60 is connected to divider 34, and may comprise an amplifier and differentiating means responsive to variations in the output of divider 34. The output current of circuit 60 is fed to the winding of relay 62 to control the opening and closing of relay contacts connecting transformer 64 to stability indicating lamp 66, so that when the relay contacts are closed in response to a variation or instability of the output of divider 34 transformer 64 energizes lamp 66 to warn against making a reading of voltmeters 54 and 56. Conversely, lamp 66 may be normally energized and the lamp circuit opened by relay 62 during instability or a transient condition.

Because of the volatility of liquid used in the test apparatus, and for safety purposes, a purge 70, or similar fan device forces fresh air through the test stand to clear the latter before the circuitry can be energized. One hundred fifteen volt power from a supply unit 72, is supplied to the blower 70 which produces an air current to activate a sail switch 74 which in turn is conected to and activates a timer, the latter after about two minutes then energizes the instruments.

If for any reason there exists a failure of the blower motor or blockage of the air filter element, said switch 74 will open, thereby disconnecting all equipment.

Figure 2:
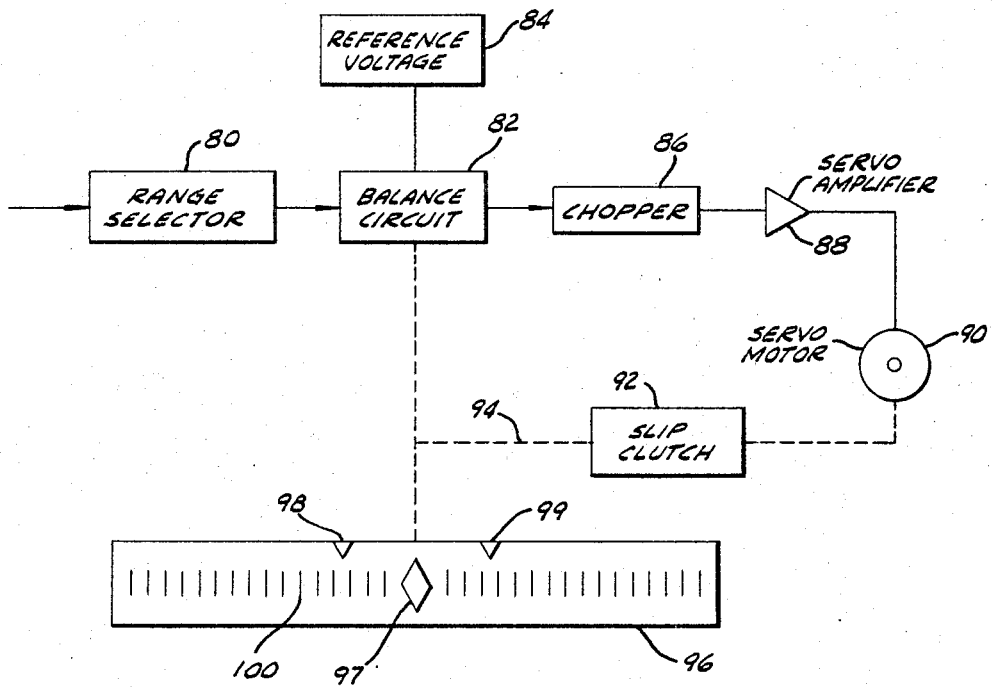
FIGURE 2 is a block diagram of one of the voltmeter indicators.

FIGURE 2, is a block diagram in greater detail, of servo-voltmeters 54 and 56. The input voltage to be measured is supplied to a range selector 80 which includes an attenuator, a low pass noise filter, summing resistors, and a selector switch for selecting a desired one of a plurality of voltage ranges. Balance circuit 82 connected to the surge selector, compares the input voltage with a portion of a reference voltage supplied from source 84. The output of balance circuit 82 is impressed on an electronic chopper circuit 86, forming the input to servo amplifier 88 for driving servo motor 90.

The latter operates through a slip clutch 92 and appropriate linkage 94 to drive indicator 96 and a slide wire balancing potentiometer connected in balance circuit 82. Indicator 96 has a driven pointer 97 and adjustable limit markers 98 and 99 positioned on a long linear scale 100. Slip clutch 92 prevents damage due to overdriving the pointer 97. Markers 98 and 99 are set to indicate predetermined tolerance limits.

Operation of the carburetor test stand will be understood by those skilled in the art from the preceding description of the apparatus. A complete system for testing carburetors over the required speed range, including curb idle, preferably consists of two test stands of the type illustrated in FIGURE 1, differing essentially in that they have different orifice plates 44 to effect a different pressure drop, with correspondingly different circuit adjustments. Both stands are arranged so that a single operator may manipulate two test stands simultaneously. This enables an operator, after making an adjustment on one test stand, to turn to the operation of the other test stand while allowing stabilization of the readings at the first stand to occur in response to adjustments which were made on the first test stand. One orifice plate is provided having a large orifice to permit high air flow rates, and the other orifice plate is designed with a smaller orifice for low air flow rates.

Servo voltmeters 54 and 56 are set to a suitable voltage range to provide good resolution, and by means of a zero-offset knob are adjusted so that pointer 97 is at the center of the scale. If, for example, the "span" or deflection sensitivity adjustments of the respective voltmeters are set to give a full scale reading for an input of 10 volts, then each 0.1 volt deviation would represent a one percent deviation, to allow for easy reading. The adjustment of the air flow measuring circuit consists simply in applying a voltage to transducer 46 from circuit 48 which will keep the output of the transducer below a given limit, approximately 36 mv., for all air flow rates. The gain of amplifier 50 is set to keep its output below the maximum value, approximately 10 volts, to be supplied to divider 34. Differences in response from one transducer to another are compensated by changing the gain of amplifier 50. Fuel flow measuring circuits 26–32 are also adjusted to keep the input voltage to divider 34 below a given limit, approximately 10 volts, for all fuel flow rates. After the carburetor is mounted on stand 22, the throttle is set to an air flow rate corresponding to one of the test points as measured on voltmeter 54. Stability indicator 66 will indicate a transient condition, at least until the fuel flow reaches a steady value. When an "idle" point is being tested, the valve controlling the idle fuel passage of the carburetor is adjusted until voltmeter 56 reads the required, predetermined air-fuel ratio for that test point of the carburetor while the stability indicator shows a reading is permissible. At each desired high flow rate, on one test stand, and at each desired low flow rate, on another test stand, the air-fuel flow ratio and the air flow rate are measured.

The invention is advantageous in that it measures the air-fuel flow ratio rather than the separate factors of that ratio, and also provides quick accurate measurements of this ratio as well as the air flow rate. Further, the easy adjustment of the various circuits and sensing of fluid stability permits, a mutually continuous out flow of completely tested and calibrated carburetors. While the invention has been herein described specifically, its scope is not to be construed as limited except as defined in the following claims.

We claim:

1. A carburetor test system comprising an air flow line, a stand including means for mounting a carburetor with its output connected to said air flow line, a fuel flow line adapted to be connected to the carburetor, measuring means in said air flow line for measuring the rate of air flow, means connected to said carburetor for producing a flow of air therethrough, a fluid flowmeter connected to said fuel flow line, converting means connected to said flowmeter and said air flow measuring means for generating electrical signals having magnitudes continuously representing the rate of fuel flow and the rate of air flow, respectively, and electronic computing means connected to said converting means for forming said electrical signals into a readable ratio, means for indicating said ratio, and stability indicating means responsive to said signals for indicating variation of said ratio after an adjustment of the carburetor, to warn against reading said ratio before it has stabilized to a constant value.

2. The system defined in claim 1, wherein said stability indicating means includes a differentiating circuit and an indicating device connected to the output of said differentiating circuit.

3. In a system as defined in claim 1, wherein said air flow measuring means in said air flow line includes a calibrated orifice plate positioned in said air flow line, air pressure controlling means connected to said air flow line, an air pressure differential transducer connected across said orifice plate and having a direct current output, and means for impressing said direct current output on said electronic computing means.

4. A carburetor test system comprising an air flow line, and a fuel flow line connected to the carburetor, air flow measuring means connected to said air flow line for measuring the air flow rate therethrough, a fluid flowmeter connected to said fuel flow line, said air flow measuring means including indicator means for indicating the rate of air flow, electronic computing means responsive to said flowmeter and to said air flow measuring means for computing the ratio of air flow rate to fuel flow rate, and means for indicating said ratio, said means for indicating the ratio of air flow rate to fuel flow rate including a voltmeter, said voltmeter including means for causing the latter to give a zero-center reading at a desired value of said ratio, and means in said voltmeter for adjusting the deflection sensitivity to variations from said desired value.

5. In a system as defined in claim 4 wherein said means for indicating the rate of air flow includes a voltmeter, means in said voltmeter for offsetting its reading, and means in said voltmeter for adjusting its deflection sensitivity.

6. In a system as defined in claim 5 wherein each of said voltmeters is a servo-voltmeter including a servo amplifier, and a servo motor connected thereto, a meter including a pointer driven by said motor, and an error detecting circuit responsive to the position of said pointer and to the output of said computing means, the output of the error-detecting circuit being connected to the input of said servo amplifier.

References Cited

UNITED STATES PATENTS

| | | | |
|---|---|---|---|
| 2,493,587 | 1/1950 | Lee | 73—118 |
| 2,734,381 | 2/1956 | Jacobson | 73—196 |

FOREIGN PATENTS

| | | |
|---|---|---|
| 202,541 | 7/1956 | Australia. |
| 256,817 | 4/1963 | Australia. |
| 810,035 | 3/1959 | Great Britain. |

OTHER REFERENCES

"Pratt & Whitney Aircraft Measures Jet Fuel/Air Ratios in Seconds," from the Journal of the SCMA, "Two-Range Flow-Rate and Totalizing System," by (Ross, Jr. and Chrusch), p. 276, vol. 30, of Instruments and Automation, February 1957.

JAMES J. GILL, *Primary Examiner.*

R. S. SALZMAN, *Assistant Examiner.*

U.S. Cl. X.R.

73—195, 196